Feb. 25, 1936.   A. M. WIGHTMAN   2,031,872
ROLLER
Filed July 30, 1934
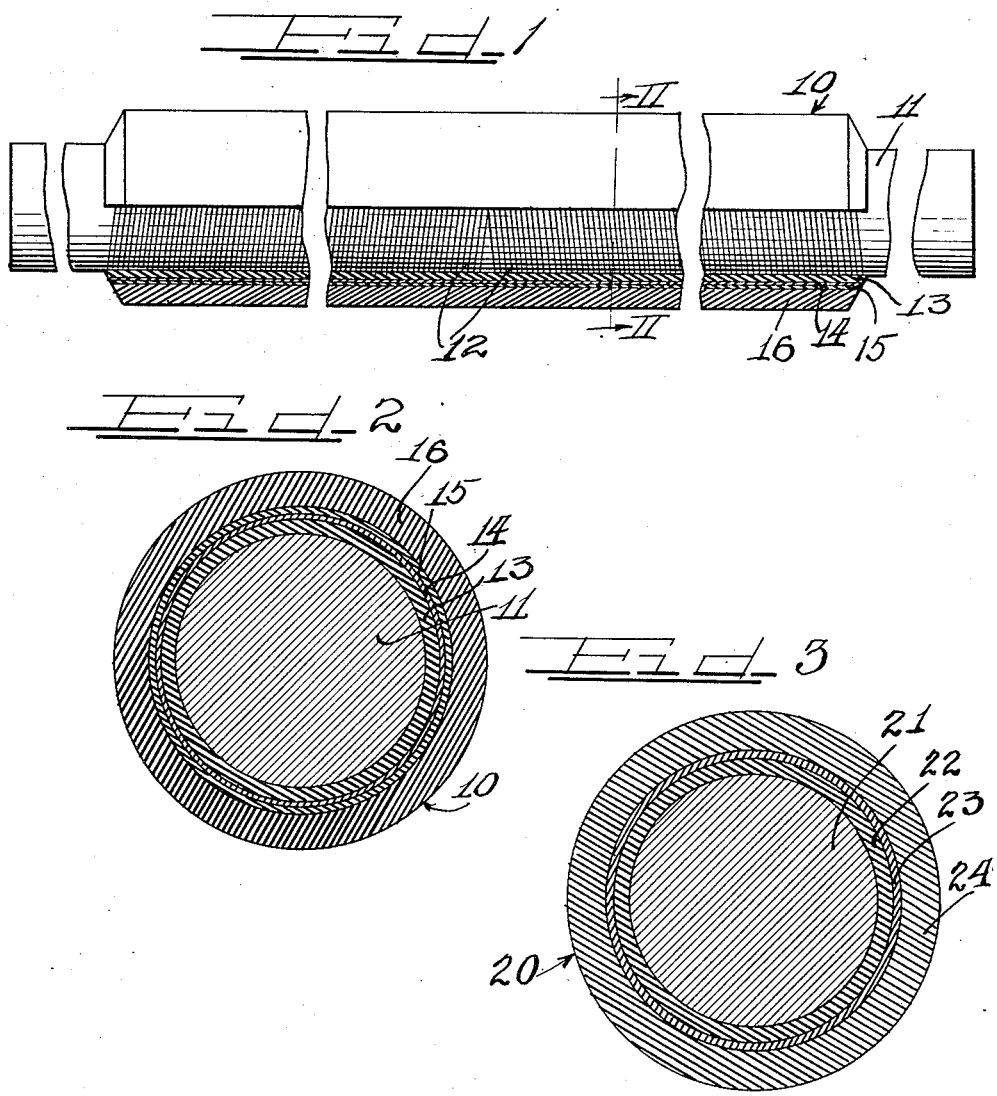
Inventor
Andrew Morris Wightman.
By Charles... Attys.

Patented Feb. 25, 1936

2,031,872

UNITED STATES PATENT OFFICE 2,031,872

ROLLER

Andrew Morris Wightman, Chicago, Ill., assignor to Rapid Roller Company, Chicago, Ill., a corporation of Illinois Application July 30, 1934, Serial No. 737,481

6 Claims. (Cl. 91—67.8)

This invention relates to rollers such as are used in the graphic arts. More specifically this invention relates to rubber rollers for use as impression rollers in rotogravure and intaglio printing processes.

Inking rollers for typographic and for lithographic printing are generally made of a very soft rubber since these types of rollers merely distribute the ink from the ink fountain of a printing press and deposit the same on the printing type or plate. However, impression rollers are much harder than inking rollers because they are used under high pressure to force the material being printed against the printing cylinder.

Nevertheless, they must, at the same time, possess a certain degree of elasticity to force the paper into the ink filled cavities in the etched cylinders.

Impression rollers, as heretofore prepared, have not possessed desired wearing qualities since the rubber surface to be elastic must be softer than is desired and thus quickly wears away during use. Furthermore, the great pressure maintained between the etched cylinder and the impression roller in rotogravure and intaglio processes has a tendency to separate the rubber from the steel core. In many instances, the rubber breaks away completely from the core with resultant damage to the etched cylinder and loss of production time required for replacement.

I have now provided a type of impression roller which possesses improved wearing qualities over heretofore known rollers. The roller of my invention includes a base layer of hard rubber vulcanized to a steel core and a cushioning layer of soft rubber or other elastic material between the base layer of the hard rubber and the surface rubber layer. This cushioning layer makes possible the use of harder and better wearing material in the surface layer without destroying the resiliency of the roll. The cushion layer also prevents the rubber from breaking away from the core.

It is therefore an object of this invention to provide a printing roller having excellent wearing qualities and elastic properties.

Another object of this invention is to provide a roller with a hard rubber surface of good wearing qualities and a cushioning material beneath said rubber surface for rendering said surface elastic.

Another object of this invention is to provide a rubber impression roller made up from a plurality of rubber layers and having a cushioning layer between two of said layers.

A specific object of this invention is to provide an impression roller for rotogravure and intaglio printing which has a metal core and a hard rubber working surface with a cushioning layer between the core and working surface to increase the elasticity of said surface.

Other and further objects of this invention will be apparent from the following specification and annexed sheet of drawings which form a part of this specification.

On the drawing:

Figure 1 is a broken elevational view, with parts in cross-section, of a preferred form of roller according to this invention.

Figure 2 is an enlarged vertical cross-sectional view of the roller shown in Figure 1 taken substantially along the line II—II of Figure 1.

Figure 3 is an enlarged vertical cross-sectional view of a modified form of roller according to this invention.

As shown on the drawing:

In Figures 1 and 2, the reference numeral 10 indicates generally an impression roll comprising a metal core 11 which is preferably grooved or scored as shown at 12, a hard rubber layer 13 vulcanized around the core 11, a body layer of rubber 14, a cushioning layer 15 of soft rubber and the surface layer 16 of a rubber material having good wearing qualities.

In the modified form of roller shown on the drawing in Figure 3, one of the intermediate rubber layers is omitted. As shown in Figure 3, the reference numeral 20 indicates a rubber roller having a metal core 21, a layer of hard rubber 22 vulcanized therearound, a cushion layer 23 and a surface layer 24.

It is generally recognized that a soft rubber cannot be firmly vulcanized to a metal. Therefore, in the rollers of this invention a hard rubber such as the layer 13 shown in Figures 1 and 2 or the layer 22 shown in Figure 3 is vulcanized onto the steel core 11 or 21 to provide an integral bond between the layer and the core. The hard rubber layer 13 or 22 has a hardness, as indicated by the Shore hardness tester, of from 98° to 100°. This Shore hardness is a standard reference used as describing the hardness of an elastic body such as rubber wherein 100° is considered as the hardest rubber and 0° is considered to be the softest rubber.

As shown in Figures 1 and 2 a body rubber layer 14 is vulcanized, cemented or otherwise secured around the hard rubber layer 13. This body layer preferably has a Shore hardness of about 85°.

The cushion layer 15 is next vulcanized or otherwise secured around the body layer 14. The cushion layer 15 is quite soft and has a Shore hardness of about 65° to 70°.

Another body layer 16 forming the working surface of the roll is secured around the cushion layer 15. The surface layer 16 has a Shore hardness substantially the same as the body layer 14, viz. about 85°.

The layers 14 and 15 are relatively thin and in forming an impression roll with a steel core of about 4" in diameter it has been found desirable to form the hard rubber layer 13 to a thickness of about $\frac{1}{16}$". The body rubber layer 14 surrounding the layer 13 is about one third the thickness of the layer 13, thus being about $\frac{1}{16}$" thick in this instance. The cushioning layer 15 may be as thin as $\frac{3}{32}$" while the wearing surface layer 16 can be about $\frac{1}{16}$" or more in thickness.

In the modified form of roller shown in Figure 3 wherein the intermediate body layer is omitted, the hard rubber layer 22 preferably has a Shore hardness of from 98° to 100°. The cushioning layer has a Shore hardness of about 65° to 70° while the wearing surface layer has a Shore hardness of about 85°.

The provision of a cushioning layer between the hard rubber base and the hard surface layer overcomes the breaking away of the rubber from the steel core while at the same time the finished roller itself has a Shore hardness equivalent to the Shore hardness of the surface layer since the soft cushioning properties of the cushion layer do not effect the apparent hardness of the roll. At the same time, however, the cushioning layer makes possible a much sharper impression and will bring out fine etching details that are impossible to develop with the regular type of rollers. Since the cushion layer does provide a more resilient construction, the surface layer can be harder than heretofore, and thus increase the wearing properties of the roll.

The cushioning action further makes it possible to reduce the pressure betwen the roller and the etched plate thereby prolonging the life of the roller.

Since the constituent layers of the roller are thoroughly fused together by the vulcanization process, it is impossible to separate one layer from another. An integral construction is thus obtained which will not permit a separation or breaking away during use of the roller.

While the impression rollers of this invention are designed primarily for use in rotogravure and intaglio printing operations, it is obvious that they may be used with great advantages for mechanical purposes such as for wringer rolls, squeeze rolls, and the like.

Having now described my invention, I am aware that many changes may be made and numerous details of construction may be varied through a wide range without departing from the principles of this invention, and I, therefore, do not purpose limiting the patent granted hereon otherwise than necessitated by the prior art.

I claim:

1. An impression roller comprising a metal core, a hard rubber base layer secured thereto, a body rubber layer over said hard rubber layer, an outer surface layer of hard rubber and a cushioning layer of soft rubber between said body layer and said surface layer, all of said layers being firmly bonded together.

2. An impression roller comprising a metal core, a base layer of rubber having a Shore hardness of about 98° to 100° vulcanized to said steel core, a thin body layer of rubber having a Shore hardness of about 85° vulcanized to said hard rubber, a thin cushion layer of rubber having a Shore hardness of about 65° to 70° vulcanized to said body rubber layer and an outer smooth surface layer of rubber having a Shore hardness of about 85° vulcanized to said cushion layer.

3. An impression roller comprising a metal core, a base layer of rubber having a Shore hardness of about 98° to 100° securely bonded to said steel core, a thin cushion layer of rubber having a Shore hardness of about 65° to 70° secured to said hard rubber and a surface layer of rubber having a Shore hardness of about 85° secured around said cushion layer.

4. An impression roller for use in rotogravure and intaglio printing processes comprising a metal core having grooves in the surface thereof, a hard rubber base layer vulcanized around said core to said grooved surface, a body layer of somewhat softer rubber securely bonded to said hard rubber base layer, a thin cushioning layer of soft rubber bonded to said body layer and a surface rubber layer of substantially the same hardness as the body layer bonded around said cushion layer.

5. An impression roller for use in rotogravure and intaglio printing processes comprising a hard rubber sleeve about $\frac{1}{16}$" in thickness having a Shore hardness of about 98° to 100° vulcanized around said core, a body rubber sleeve about $\frac{1}{16}$" in thickness having a Shore hardness of about 85° vulcanized around said hard rubber sleeve, a cushion rubber sleeve about $\frac{3}{32}$" in thickness having a Shore hardness of about 65° to 70° vulcanized around said body rubber sleeve and a surface rubber layer having a Shore hardness of about 85° vulcanized around said cushion sleeve.

6. An impression roller for use in rotogravure and intaglio printing processes comprising a hard rubber sleeve about $\frac{1}{16}$" in thickness having a Shore hardness of about 98° to 100° vulcanized around said core, a cushion rubber sleeve about $\frac{3}{32}$" in thickness having a Shore hardness of about 65° to 70° vulcanized around said rubber sleeve and a surface rubber layer having a Shore hardness of about 85° vulcanized around said cushion sleeve.

ANDREW MORRIS WIGHTMAN.